United States Patent
Reinprecht et al.

(10) Patent No.: US 10,386,696 B2
(45) Date of Patent: Aug. 20, 2019

(54) ILLUMINATION APPARATUS FOR A MOTOR VEHICLE

(71) Applicant: ZKW Group GmbH, Wieselburg (AT)

(72) Inventors: Markus Reinprecht, Pielachhauser (AT); Michael Riesenhuber, Wieselburg (AT)

(73) Assignee: ZKW GROUP GMBH, Wieselburg (AT)

( * ) Notice: Subject to any disclaimer, the term of this patent is extended or adjusted under 35 U.S.C. 154(b) by 80 days.

(21) Appl. No.: 15/565,183

(22) PCT Filed: Feb. 24, 2016

(86) PCT No.: PCT/AT2016/050041
§ 371 (c)(1),
(2) Date: Oct. 9, 2017

(87) PCT Pub. No.: WO2016/164945
PCT Pub. Date: Oct. 20, 2016

(65) Prior Publication Data
US 2018/0101084 A1 Apr. 12, 2018

(30) Foreign Application Priority Data
Apr. 16, 2015 (AT) .............. A 50302/2015

(51) Int. Cl.
*G02F 1/33* (2006.01)
*G02B 19/00* (2006.01)
(Continued)

(52) U.S. Cl.
CPC .......... *G02F 1/33* (2013.01); *F21K 9/64* (2016.08); *F21S 41/14* (2018.01); *F21S 41/16* (2018.01);
(Continued)

(58) Field of Classification Search
CPC ..................................................... G02F 1/33
See application file for complete search history.

(56) References Cited

U.S. PATENT DOCUMENTS 3,627,405 A * 12/1971 Feldman .............. G02F 1/33
                                                  359/305
4,456,338 A *  6/1984 Gelbart ............... G02F 1/11
                                                  359/286
(Continued)

FOREIGN PATENT DOCUMENTS

| WO | 2004/003971 A2 | 1/2004 |
|---|---|---|
| WO | 2004/100624 A2 | 11/2004 |
| WO | WO2015/159764 | * 4/2015 |

OTHER PUBLICATIONS

International Preliminary Report on Patentability for PCT/AT2016/050041, dated Mar. 31, 2017 (8 pages).
(Continued)

*Primary Examiner* — Evan P Dzierzynski
(74) *Attorney, Agent, or Firm* — Eversheds Sutherland (US) LLP

(57) ABSTRACT

The invention relates to an illumination apparatus (100), in particular for a motor vehicle, comprising at least one laser light source (10) for producing excitation light, at least one wavelength conversion element (20), which is designed to receive excitation light from the at least one laser light source (10) in the form of an excitation-light light bundle, at least one optical imaging element (30*a*, 30*b*, 30*c*; 31; 32), which images light, which is emitted in the visible wavelength range by the wavelength conversion element (20), in the form of at least one light distribution or one partial light distribution (LVa, LVb, LVc, LVd, LVe), and at least one beam-deflecting device in the beam path between the at least one laser light source (10) and the at least one wavelength conversion element (20). The beam-deflecting device is
(Continued)

Figure 1:
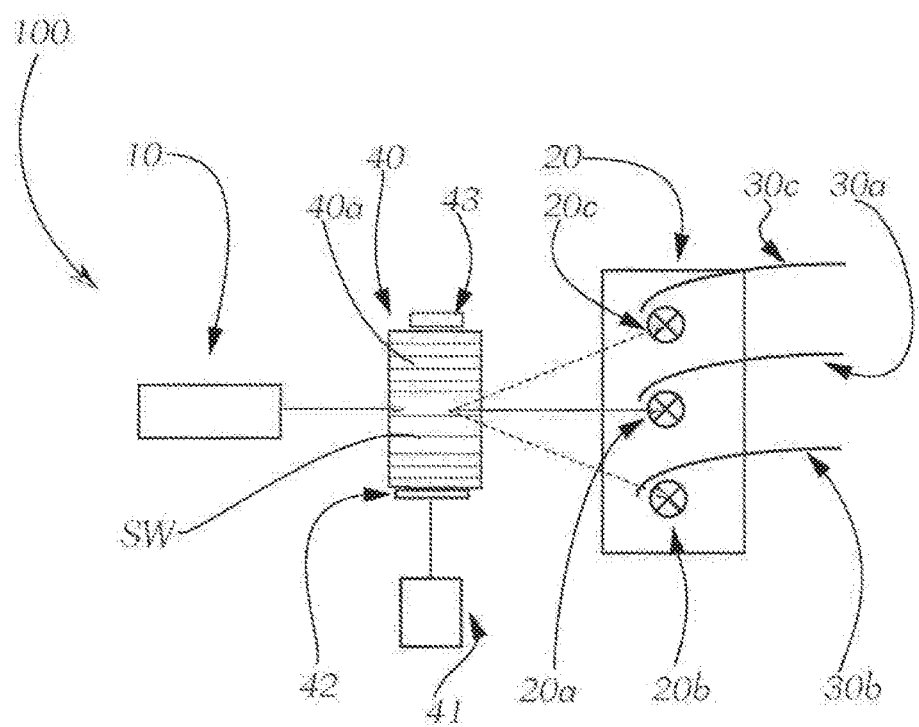

designed as an acousto-optic modulator (40), which comprises a solid medium (40a), which is optically transparent at least to excitation light of the at least one laser light source (10) and through which the excitation-light light bundle is passed, and wherein a control device (41) is provided, by means of which sound waves having a frequency or a plurality of, in particular, different frequencies can be produced in the solid medium (40a) of the acousto-optic modulator (40) in accordance with specified or specifiable control parameters such that the excitation-light light bundle is deflected to different regions (20a, 20b, 20c; 20a, 20b, 20c, 20d, 20e) of a conversion element (20) and/or to different conversion elements in accordance with the frequency of the applied sound waves.

25 Claims, 9 Drawing Sheets

(51) Int. Cl.
*F21S 41/14* (2018.01)
*F21S 41/20* (2018.01)
*F21S 41/64* (2018.01)
*F21S 41/16* (2018.01)
*F21K 9/64* (2016.01)
*F21S 41/32* (2018.01)
*F21Y 115/10* (2016.01)
*F21Y 115/30* (2016.01)

(52) U.S. Cl.
CPC ............. *F21S 41/285* (2018.01); *F21S 41/32* (2018.01); *F21S 41/645* (2018.01); *G02B 19/0061* (2013.01); *F21Y 2115/10* (2016.08); *F21Y 2115/30* (2016.08)

(56) References Cited

U.S. PATENT DOCUMENTS

| | | |
|---|---|---|
| 2004/0001239 A1 | 1/2004 | Brukilacchio et al. |
| 2005/0276053 A1 | 12/2005 | Nortrup et al. |
| 2008/0247027 A1* | 10/2008 | Wasilousky ............ G02F 1/113 359/286 |
| 2014/0313569 A1* | 10/2014 | Protz ......................... G02F 1/33 359/310 |
| 2015/0029409 A1 | 1/2015 | Chen |
| 2016/0131321 A1 | 5/2016 | Yamanaka et al. |
| 2016/0274440 A1* | 9/2016 | Dieudonne ............... G02F 1/33 |
| 2017/0030544 A1* | 2/2017 | Tsuda ..................... G02B 26/10 |
| 2017/0038582 A1* | 2/2017 | Chau .................. G02B 27/0101 |

OTHER PUBLICATIONS

Office Action issued in Austrian Application No. A50302/2015, dated Feb. 10, 2016 (3 pages).

* cited by examiner

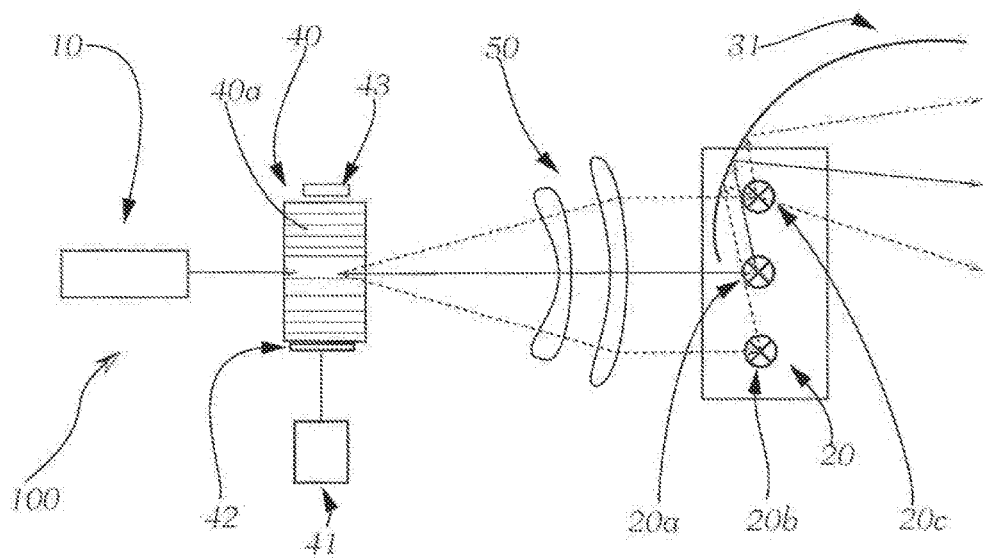
Fig.3
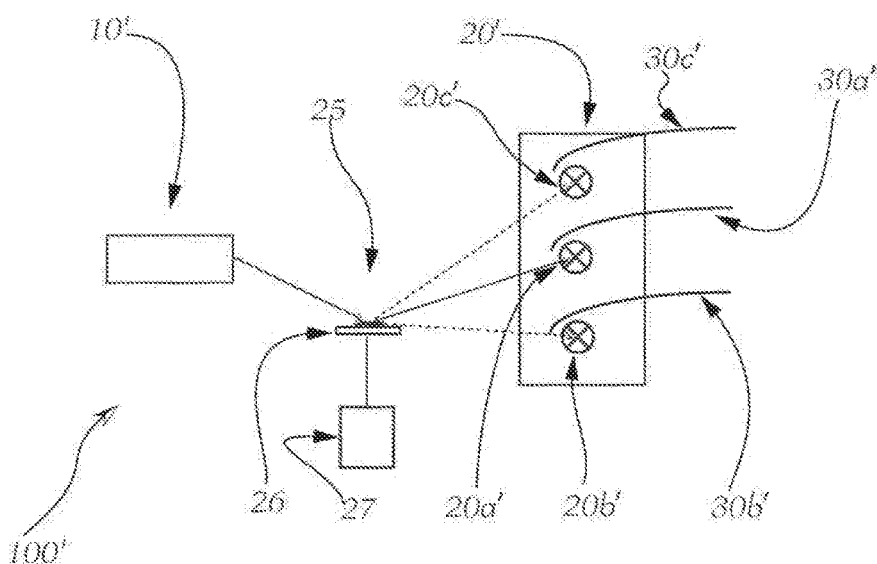
Fig.11 (Stand der Technik)

ILLUMINATION APPARATUS FOR A MOTOR VEHICLE

The invention relates to an illumination apparatus, in particular for a motor vehicle, comprising:

at least one laser light source for producing excitation light;

at least one wavelength conversion element, which is designed to receive excitation light from the at least one laser light source in the form of an excitation-light light bundle;

at least one optical imaging element, which images light, which is emitted in the visible wavelength range from the wavelength conversion element, in the form of at least one light distribution or one partial light distribution; and at least one beam-deflecting device in the beam path between the at least one laser light source and the at least one wavelength conversion element.

The invention also relates to an illumination system for a motor vehicle headlamp, which illumination system comprises two or more illumination apparatuses of this kind.

The invention additionally relates to a motor vehicle headlamp having one or more illumination apparatuses of this kind and/or having one or more illumination systems of this kind.

Lastly, the invention also relates to a motor vehicle having one or two motor vehicle headlamps of this kind.

Laser light sources (for example semiconductor lasers, laser diodes) have a range of special advantageous properties, for example high radiation intensities and a small light-emitting area. In addition, the emitted light bundles are collimated to the greatest possible extent. In the present context, a laser light source is understood to mean a light source which comprises one or more semiconductor lasers and/or one or more laser diodes which emits or which jointly emit a light bundle that is collimated to the greatest possible extent.

This results in a range of advantages for the use of laser light sources for illumination purposes, for example optical systems in which a laser light source is used as light source can be produced with shorter focal lengths and more heavily bundled beam paths. This is not possible with less heavily collimated light bundles (for example of incandescent lamps or light-emitting diodes (LEDs) with a Lambert's emission characteristic). Optical systems for laser light having a small installation space can thus be produced with use of laser light sources.

Lasers generally emit monochromatic light or light in a narrow wavelength range. In the case of a motor vehicle headlamp, however, white mixed light is desirable or legally required for the emitted light, and therefore laser light sources cannot be readily used in a motor vehicle headlamp.

In order to convert monochromatic light into white or polychromatic light, in particular in conjunction with white light-emitting diodes (LEDs) or luminescence conversion LEDs, what are known as conversion elements (also referred to in this text as wavelength conversion elements) are often used. A conversion element of this kind is provided for example in the form of a photoluminescence converter or photoluminescence element or comprises at least one photoluminescence converter or at least one photoluminescence element. These generally comprise a photoluminescence dye.

The light of a laser light source usually emitting monochromatic (for example blue) light (also referred to as "excitation light") excites the photoluminescence dye to photoluminescence, whereupon the photoluminescence dye itself emits light of other wavelengths (for example yellow). In this way, some of the emitted light of one wavelength range can be converted into light of another wavelength range. A further portion of the emitted light (excitation light) is generally scattered and/or reflected by the photoluminescence element. The scattered and/or reflected light and the light emitted by photoluminescence are then superimposed additively and lead for example to white mixed light. The mechanism of the photoluminescence can be differentiated, in accordance with the lifetime of the excited state, into fluorescence (short lifetime) and phosphorescence (long lifetime).

In the case of the conversion elements, a distinction is made between reflective and transmissive conversion elements. In reflective conversion elements the light converted by the conversion elements is emitted on the same side on which the excitation light contacts the conversion element. In transmissive conversion elements the converted light is emitted from the side facing away from the side on which the excitation light contacts the conversion element.

In conventional headlamps a light centre displacement or a displacement of a light distribution or a partial light distribution requires a large installation space, since the entire light module or at least a lens has to be mechanically pivoted. Other solutions in which a light distribution is produced using a plurality of light sources and in which solutions the light distribution is displaced by switching on further light sources and, as appropriate, by switching off other light sources, require the integration of a very large light output, only a certain portion of which, however, can ever be used for the production of the active light distribution.

The object of the invention is to specify a solution for an illumination apparatus, in particular for an illumination apparatus for a motor vehicle, which requires a small installation space and which enables a light centre displacement or a displacement of part of a light distribution or a total light distribution.

This problem is achieved with an illumination apparatus of the type mentioned in the introduction, which, in accordance with the invention, comprises at least one beam-deflecting device, which is designed as an acousto-optic modulator, which comprises a solid medium, which is optically transparent at least to excitation light of the at least one laser light source and through which the excitation-light light bundle is passed, and wherein sound waves having a frequency or a plurality of, in particular, different frequencies can be produced in the solid medium of the acousto-optic modulator—for example using a control device, which controls the at least one acousto-optic modulator preferably in accordance with specified or specifiable control parameters-, such that the excitation-light light bundle is deflected to different regions of a conversion element and/or to different conversion elements in accordance with the frequency of the applied sound waves.

An acousto-optic modulator comprises a see-through, i.e. optically transparent, solid medium. A solid is to be understood here to mean, in particular, solids in the actual sense, such as glass and crystals. In order to produce sound waves, a piezoelement is attached to the solid medium in one region, and opposite the piezoelement there is disposed for example a sound absorber, in order to avoid reflections and standing waves. The deflection of light in an acousto-optic modulator of this kind functions in accordance with the principle of diffraction of light at a diffraction grating. The diffraction grating consists of the density fluctuations of a sound wave passing through the crystal.

The excitation-light light bundle can, in principle, pass through the acousto-optic modulator (also referred to hereinafter as an "AOM") without diffraction, with the light bundle contacting a certain side of the conversion element or a certain conversion element, and accordingly a light distribution or a partial light distribution being produced at a certain position in front of the vehicle or on a vertical screen at a distance in front of the illumination apparatus.

By applying sound waves of a suitable frequency, the excitation-light light bundle can be deflected on its way through the acousto-optic modulator and contacts another point of the conversion element or contacts another conversion element. Accordingly, the position of the light-emitting region that is ultimately responsible for the production of the light distribution or the partial light distribution is changed, and the position of the light distribution or of the partial light distribution in front of the vehicle or on the above-mentioned screen also changes accordingly. If exactly one imaging system, for example a reflector or a lens, in particular a projection lens, is provided for production of the light distribution or partial light distribution, the light spot on the conversion element in a non-deflected position, which for example is a position referred to as the "basic position", is in the focal point of this imaging system, i.e. for example in the focal point of the imaging lens or of the reflector. By deflecting the laser beam, the light spot on the conversion element is no longer in the focal point of the imaging system. Besides the position of the light distribution in the light image in front of the illumination apparatus, the shape of the produced light or partial light distribution thus also changes, which can be used in a purposeful manner.

Here, the use of an acousto-optic modulator also has the advantage that no mechanical parts that would be needed for example with the use of movable mirrors have to be used. In an acousto-optic modulator, the beam is deflected by use of an acousto-optic effect, specifically the Bragg scattering of electromagnetic radiation at sound waves in a medium. Light waves are diffracted at the induced sound waves and thus alter their propagation direction. In order to achieve the highest possible laser utilisation rates, first order diffraction is preferably used exclusively.

In principle, a plurality of conversion elements can be provided, but just precisely one conversion element is generally provided. The following considerations relate to a single conversion element, but also apply analogously for two or more conversion elements.

The conversion element has an area which is selectively illuminated by the focused laser light beam (excitation-light light beam). This laser spot on the conversion element is imaged by a downstream imaging element as light distribution, in particular as part of a light distribution in front of the illumination apparatus (in front of a vehicle when the illumination apparatus is installed in the vehicle). For example, the imaging element, as will be discussed in further detail below, is a reflector or an imaging lens, however this imaging element can also be an optics system comprising two or more optical components, such as lenses, reflectors, apertures, etc.

By changing the position of the laser spot on the conversion element (on the irradiated face), the imaged light distribution can now be controlled, i.e. in particular the position thereof can be changed. If the laser spot contacts the conversion element for example in the focal point of the imaging element, a central light spot is thus imaged. If the conversion element illuminates outside the focal point, a further outwardly lying spot is thus imaged on the road. If this is now selectively utilised, a cornering light function can be provided, for example.

A selective illumination can be provided as further light function. To this end, the laser beam is selectively guided over the conversion element so that the imaged light pattern can selectively follow an object to be illuminated.

It can be advantageous if a second acousto-optic modulator is arranged between a first acousto-optic modulator and the at least one wavelength conversion element, the solid medium of said second acousto-optic modulator being passed through by the excitation light exiting from the first acousto-optic modulator, and wherein preferably the second and the first acousto-optic modulator are arranged relative to one another in such a way that the direction of propagation of the sound waves in the two acousto-optic modulators are orthogonal to one another.

With an embodiment of this kind, different shifts of the light distribution can be produced. For example, it is possible for the first AOM to displace the laser beam horizontally, and for the second AOM to produce a vertical displacement. The first AOM can thus provide a horizontal displacement of the produced light distribution, for example of the produced spot as part of a main beam distribution, and can thus provide a cornering light function. The vertical displacement that can be provided with the second AOM can be used for a headlamp range adaptation, in particular for a dynamic headlamp range adaptation (for example headlamp levelling for compensation for example of the road course, different loading states, etc.). Horizontal and vertical displacement (or in principle any two directions) can be provided here simultaneously in a simple manner.

It can be provided that the frequency of the sound waves applied to the at least one acousto-optic modulator is varied over time, for example in that the control device is designed to vary the frequency of the sound waves over time.

In order to shift the produced light pattern, a fixed frequency is applied to the AOM. If this frequency remains unchanged, the light spot on the conversion element and accordingly the produced light pattern thus remains in the particular displaced position for as long as the frequency remains unchanged. In order to produce for example a "moving" light spot on the conversion element and therefore a moving light pattern, the frequency is varied over time in accordance with the desired position of the light pattern.

A certain angle of deflection for the laser beam is thus provided by an associated sound frequency. If different angles of deflection are to be provided, for example as described above for a moving light spot/a moving (partial) light pattern, the sound frequency must therefore be changed.

The produced sound waves are preferably flat waves.

It is advantageously provided that the at least one acousto-optic modulator is operated in the Bragg regime.

In the Bragg regime (acoustic Bragg diffraction), diffraction of the incident beam occurs in a primary direction (direction of incidence=direction of emergence), the wave vectors satisfy the condition of conservation of momentum under the Bragg condition $\sin(\theta)=$(light wavelength)/($2*$ sound wavelength), and only first order diffraction occurs.

If the AOM is operated in the Bragg regime, it is true that angle of incidence=angle of deflection. To this end, what is known as the Bragg equation must be satisfied. In order to achieve the Bragg angle, a certain frequency (=basic frequency) is thus necessary, at which the AOM is operated.

For a laser wavelength of, for example, 450 nm (for example blue laser diode based on InGaN) for excitation of the conversion element and the use of, for example, tellurium oxide $TeO_2$ as solid medium of the acousto-optic modulator, sound frequencies f for the sound waves in the GHz range result, in order to achieve a Bragg angle of a few degrees.

The following relationships occur in the above example:

$$n\theta = \frac{\lambda}{2n} \frac{f0}{Vs},$$

with n=index of diffraction (in this example n=2.26), Vs=sound speed (4200 m/s), λ=vacuum wavelength of the laser (450 nm), $f_0$=excitation frequency [Hz] and θ=Bragg angle [°]. With a Bragg angle of 1.0°, a frequency of f=736 MHz thus results under the above-described conditions so that the AOM operates in the Bragg regime.

For deflection of the excitation-light light bundle from a basic position on the conversion element, the basic frequency $f_0$ corresponding to this basic position is preferably varied by a value of +Δf.

The excitation frequency of the sound waves is increased from $f_0$, at which the incident laser beam is deflected in the basic diffraction direction θ, to $f_0$+Δf, whereby a greater angle of diffraction θ+Δθ is given for the deflected laser beam.

The angle θ is here the angle between the incident/emergent laser beam and the normal direction to the direction of propagation of the sound wave.

The frequency change can occur continuously or in discrete steps.

The diffraction typically occurs at flat waves. The possible angular range through which the diffracted light beam can be deflected is given from Δθ=(λ/Vs)*B. For laser light with a vacuum wavelength of 450 nm, this thus gives Δθ=(450 nm/(n Vs)*B, wherein n is the index of diffraction of the transparent medium of the AOM for a wavelength of 450 nm.

The maximum bandwidth for the change of the frequency B=$\Delta f_{max}$ thus lies preferably at, at most, $f_0/2$.

It can be advantageous if the sound wave, in particular the flat sound wave, has an angle of aperture $\delta\theta_S$, i.e. diverges in the direction of propagation ("angular divergence"). Preferably, $\delta\theta_S \geq \Delta\theta$.

It can be advantageous if the direction of propagation of the sound wave, in particular of the flat sound wave, can be changed. In particular, it is advantageous if the direction of propagation can be changed according to the frequency of the sound waves or the change in frequency of the sound waves. Here, the direction of propagation is changed in such a way that the angle between the incident laser beam and the direction of propagation of the sound wave changes. It can thus be ensured that, even with a change of the frequency of the sound waves, the AOM still operates in the Bragg regime.

The change in direction of the sound wave can be provided for example by the use of two or more sound generators, which for example are operated with different phase position.

The change in direction of the sound wave can alternatively or additionally be provided for example in that the AOM, i.e. in particular the optical transparent material, and the at least one sound generator are arranged rotatably.

It is preferably provided that the frequencies of the sound waves lie in a range of from 80 to 2500 MHz.

It can be advantageous if exactly one optical imaging element is provided or if exactly one optical imaging element for each conversion element is provided.

It can also be provided that exactly one optical imaging element is provided for each region of a conversion element in which excitation light can be deflected. In this embodiment, a plurality of illuminated regions on the conversion elements can be associated so that a focal point of each imaging element lies in an illuminated region.

The different imaging elements can be formed separately here, but can also be formed as one component, for example the imaging elements can be formed as different, for example horizontal, segments of a common reflector, wherein each segment of the reflector is focused onto a different region on the conversion element (in other words the focal point of the segment in question lies in an associated region) or is designed so that primarily light from a certain region reaches an associated segment of the reflector.

It can be provided that one or more or all optical imaging elements is/are formed as a reflector or as reflectors.

For example, these reflectors have a parabolic basic shape, and the reflective area additionally can be segmented.

Alternatively or in a mixed embodiment, in which one or more reflectors is/are also provided, one or more optical imaging elements is/are formed as a lens or from lenses. All imaging elements can also be formed as a lens or can be formed from lenses.

A lens of this kind or system of lenses of this kind consisting of two or more lenses preferably has a collecting effect in sum.

Usually, the conversion element has a flat face, on which laser light is incident. In such a case, a laser beam diffracted in the basic diffraction direction (in accordance with the frequency $f_0$) contact the conversion element at an angle of 90°, for example. By contrast, a beam deflected from the basic diffraction direction in accordance with the invention contacts the conversion element at another point at another angle, i.e. in this example at an angle unequal to 90°. Accordingly, not only the position of the light spot on the conversion element, but also the shape changes, which can be desirable in principle, but can also lead to an undesirable "blurry" light pattern.

It can be provided advantageously that an optical deflecting device is arranged between the at least one conversion element and the at least one acousto-optic modulator, which deflecting device deflects excitation light, exiting from the at least one acousto-optic modulator or the acousto-optic modulator arranged closest to the conversion element, parallel to a basic diffraction direction or normal to an application plane of the conversion element on which the excitation light is incident.

For example, the deflecting device comprises or consists of a lens arrangement for a telecentric objective.

Alternatively or additionally, it can be provided that an optical deflecting device is arranged between the at least one conversion element and the at least one acousto-optic modulator, which deflecting device deflects excitation light, exiting from the at least one acousto-optic modulator or the acousto-optic modulator arranged closest to the conversion element, in such a way that laser light spots of equal size are produced on a planar conversion element regardless of the angle of deflection.

For example, the deflecting device comprises an f-theta lens or an f-theta lens arrangement or a lens arrangement that comprises or consists of at least one f-theta lens.

The illumination apparatus is preferably installed in a motor vehicle, and the control parameters at a defined moment in time are dependent on a state of the motor vehicle at this defined moment in time or are dependent on a state of the motor vehicle within a time period around this defined moment in time.

The state of the motor vehicle can be described by or given from, for example, the steering angle and/or speed and/or acceleration of the vehicle and/or position data from a navigation unit of the vehicle and/or camera data of the vehicle surroundings (for example type and location of other road users) and/or road condition and/or road course (bends and/or ascents/descents), etc.

The produced light distribution or partial light distribution is preferably displaceable in the horizontal and/or vertical direction, in particular considered on a vertical screen at a defined distance, for example 10 or 25 meters, in front of the illumination apparatus.

For example, it is provided that the produced partial light distribution forms part of a main beam distribution, in particular a (preferably central) maximum spot of the main beam distribution.

In an illumination system according to the invention, which has two or more of the above-described illumination apparatuses, it can be provided that each of the illumination apparatuses forms a partial light distribution, which partial light distributions for example are arranged side by side and/or one above the other, with neighbouring and/or adjacent partial light distributions overlapping one another in part.

The illumination apparatuses preferably lie side by side and possibly in rows one above the other (either directly neighbouring one another or at a distance from one another) in a matrix-like manner and produce strip-like partial light distributions arranged side-by-side. For example, the illumination apparatuses have reflectors as imaging elements. By displacing the regions illuminated on the conversion elements by the individual laser beams, the partial light distributions can be displaced and in this way converted into cornering light. The displacement for this purpose preferably occurs quickly with a high image refresh rate of, for example, approximately 100 Hz to 10 kHz (depending on the application in question), preferably with 200 Hz to 1 kHz.

The image refresh rate is the rate at which the individual partial light distributions of the row are activated in quick succession in the short term. A sufficiently high rate results in the impression of a total light distribution. The refresh rate is therefore the rate or specifies the frequency at which the frequency for producing the sound waves in an AOM is changed.

This refresh rate is provided for the superimposition of the partial light distributions to form an overall image structure, for example individual partial light distributions are activated in short succession in a Matrix-Lite, and the driver perceives a total main beam distribution. Since the AOM can be operated quickly, image refresh rates in the kilohertz range can be provided.

A cornering light function is provided by displacing the illumination centre by using adjacently arranged "focal points". By contrast, a high image refresh rate is thus not necessary for a cornering light functionality.

As further light function, it is also conceivable to provide a selective illumination. Here, the laser beam should be guided over the phosphor so that the imaged light pattern can selectively follow an object to be illuminated. For further light functions, of course, a special optics has to be designed in order to achieve the optimal result. By way of example, a very narrow but vertically high strip light would be advantageous for a selective illumination. The exact design of this optics, however, does not form part of the invention.

Figure 2:
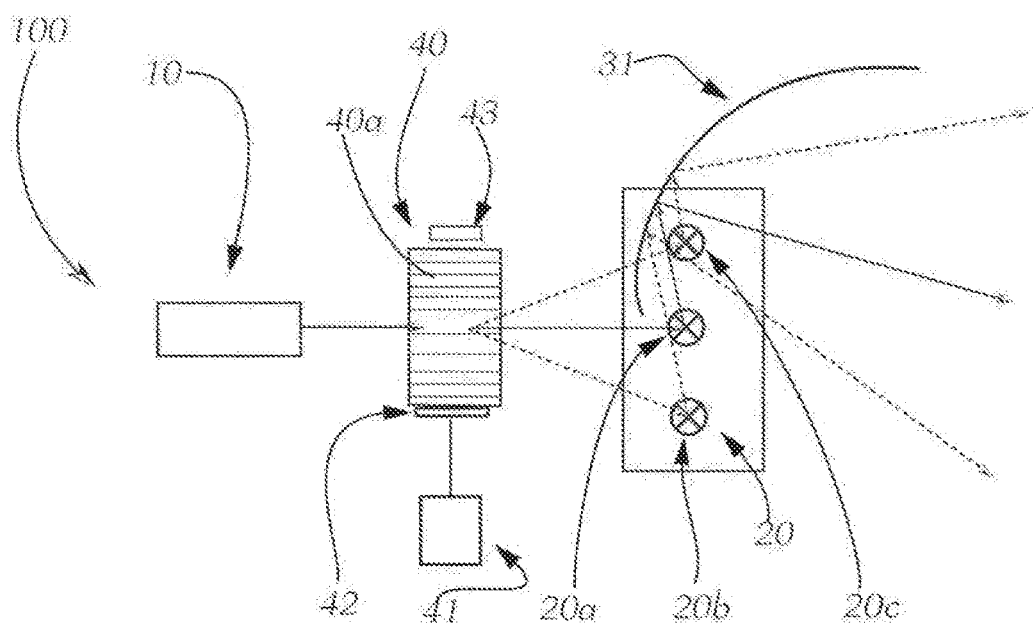
Figure 4:
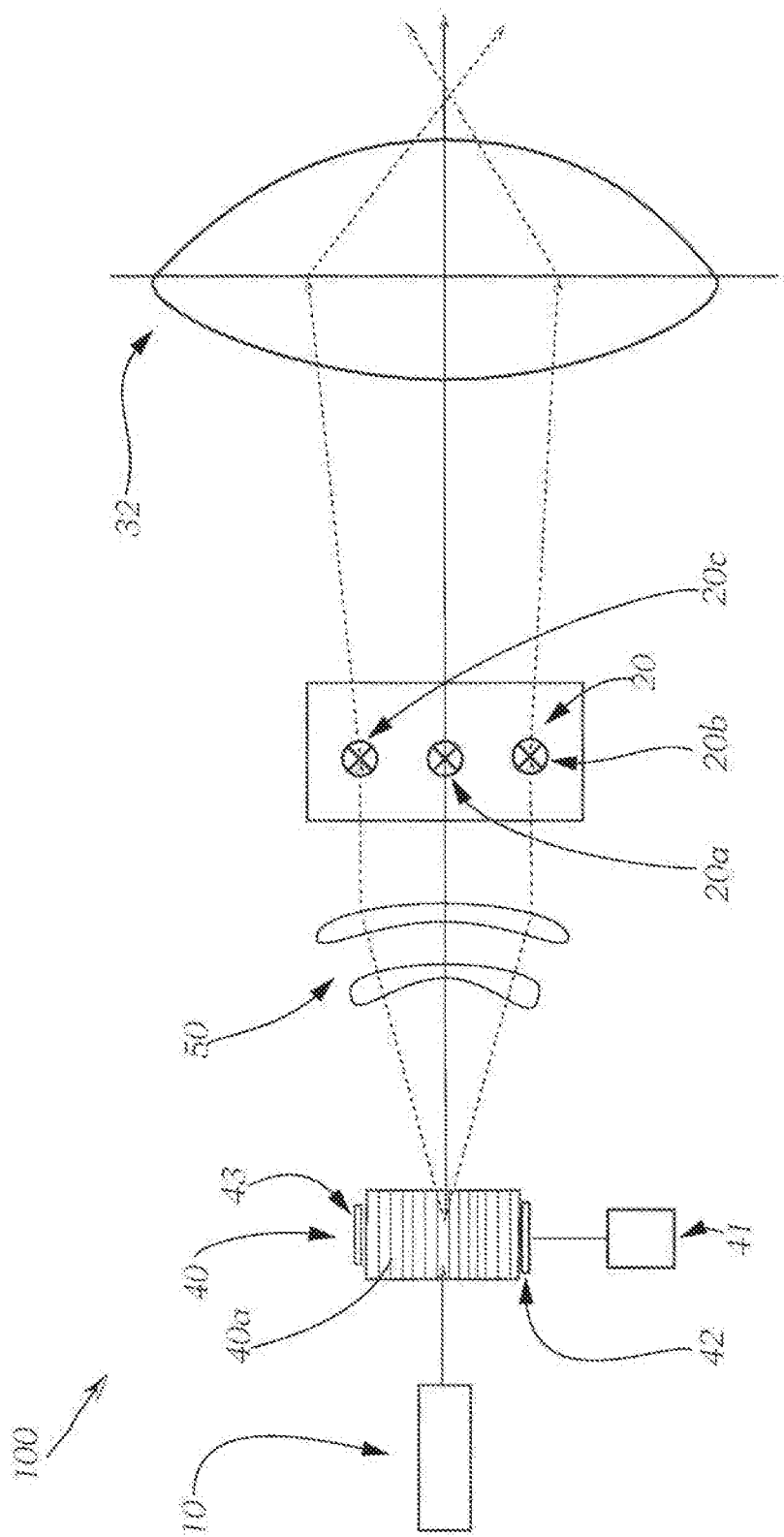
Figure 5:
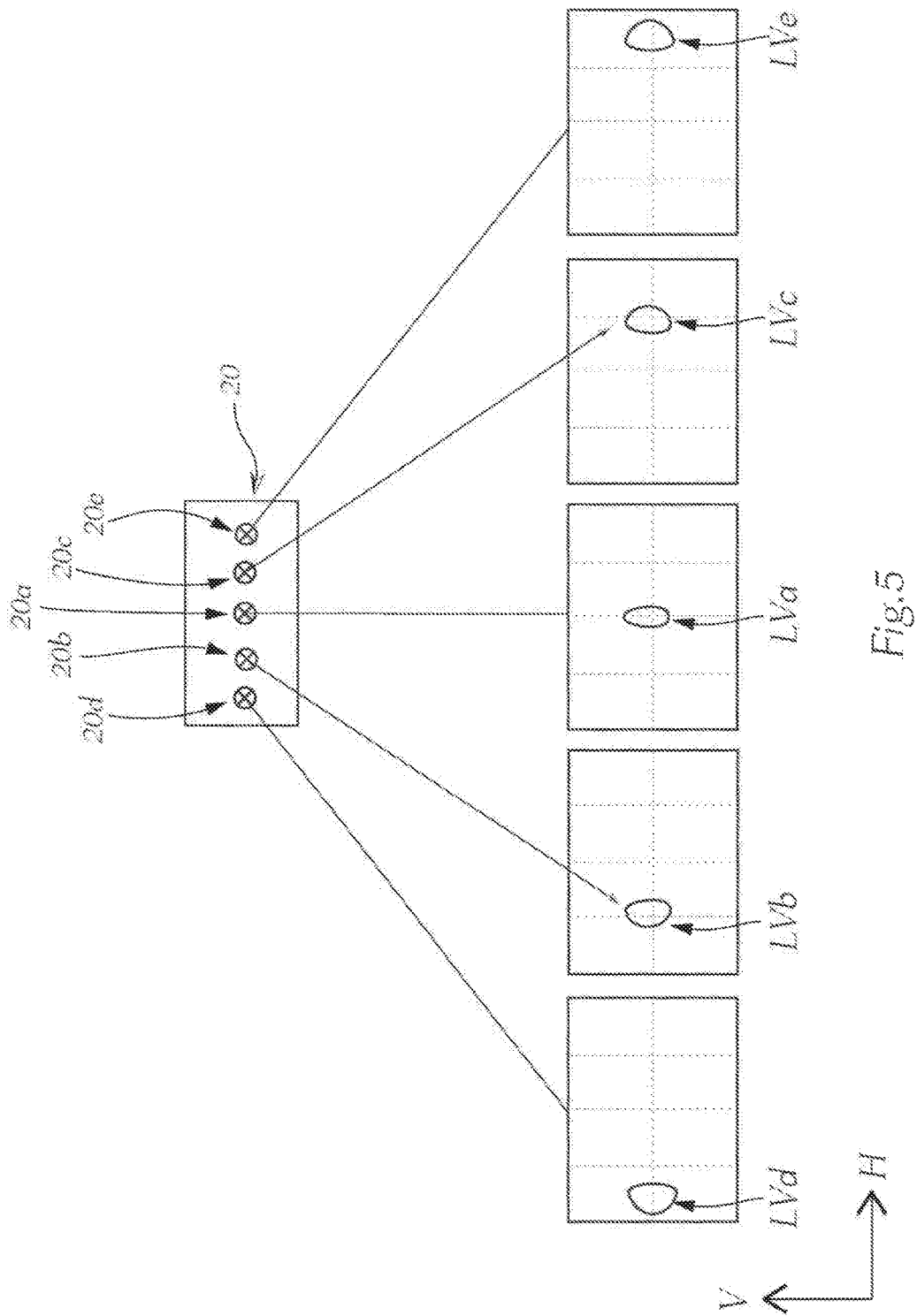
Figure 6:
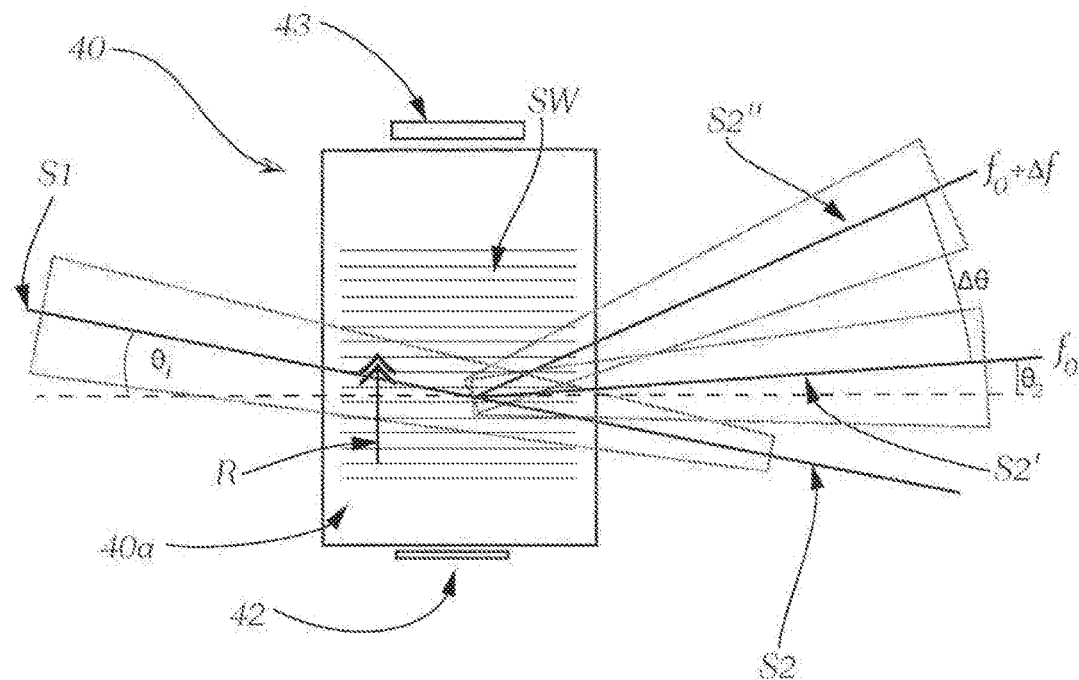
Figure 7:
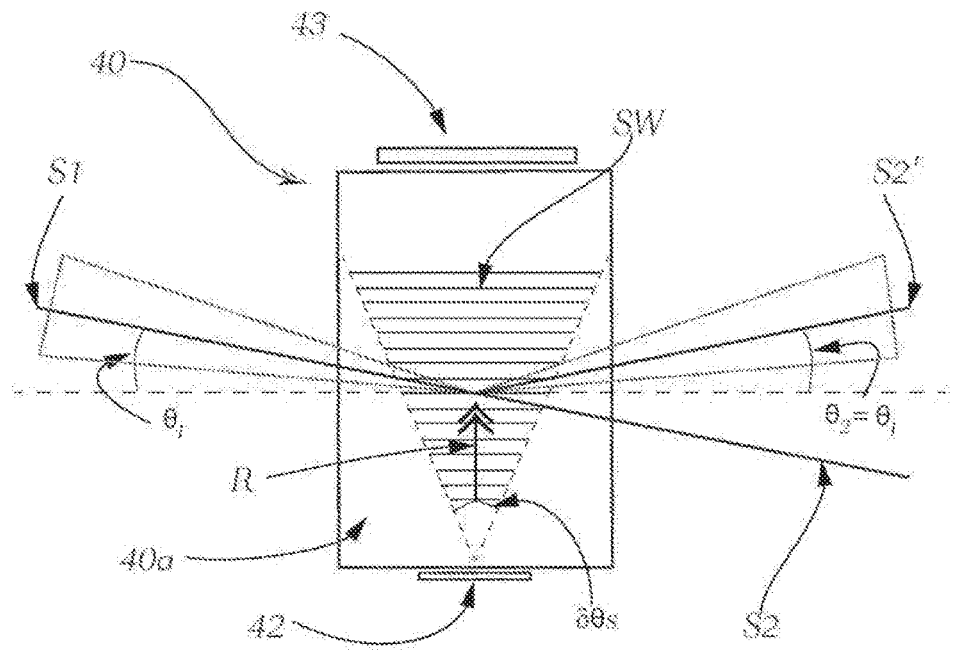
Figure 8:
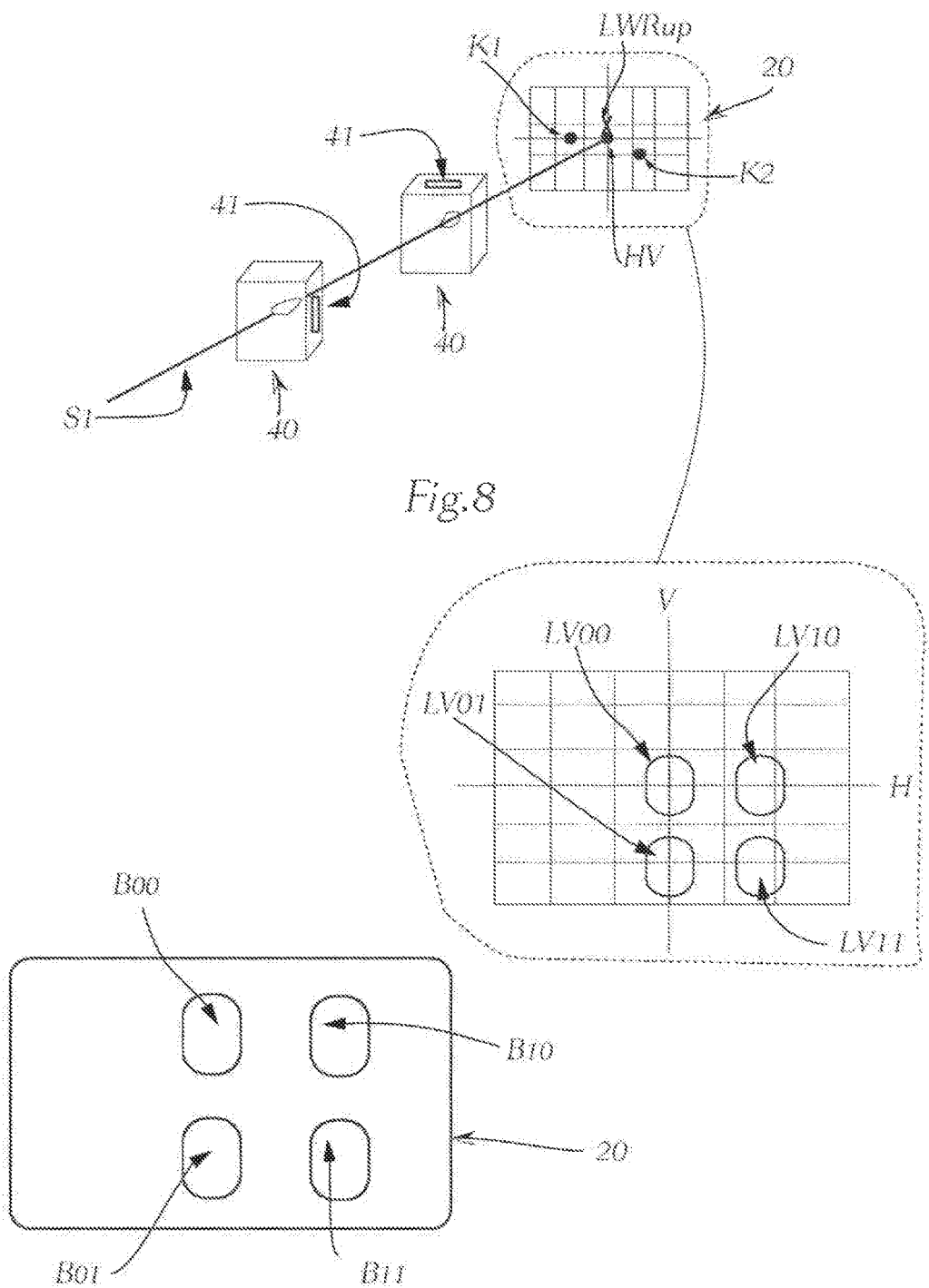
Figure 9A:
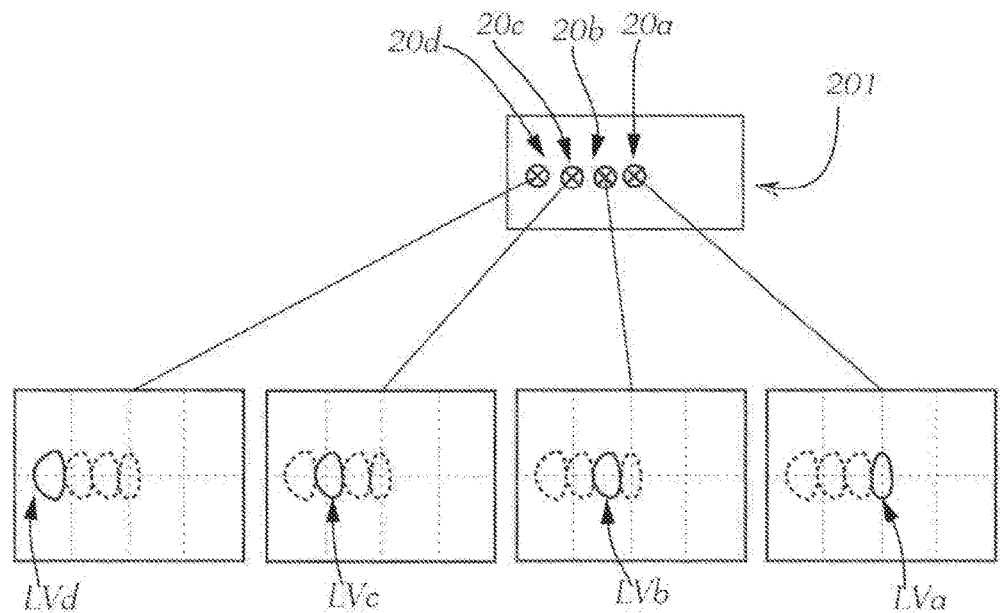
Figure 9B:
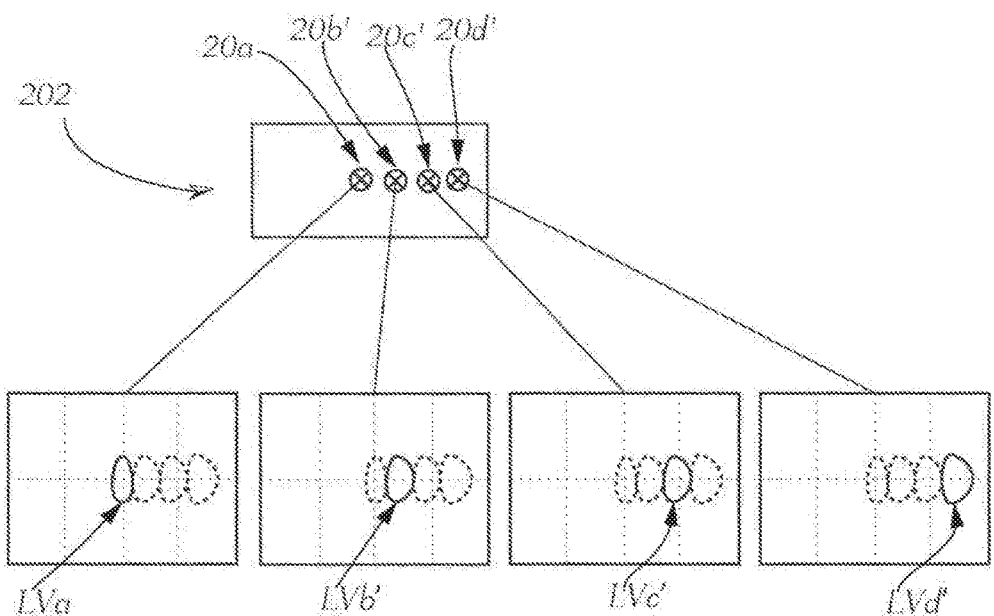
Figure 9C:
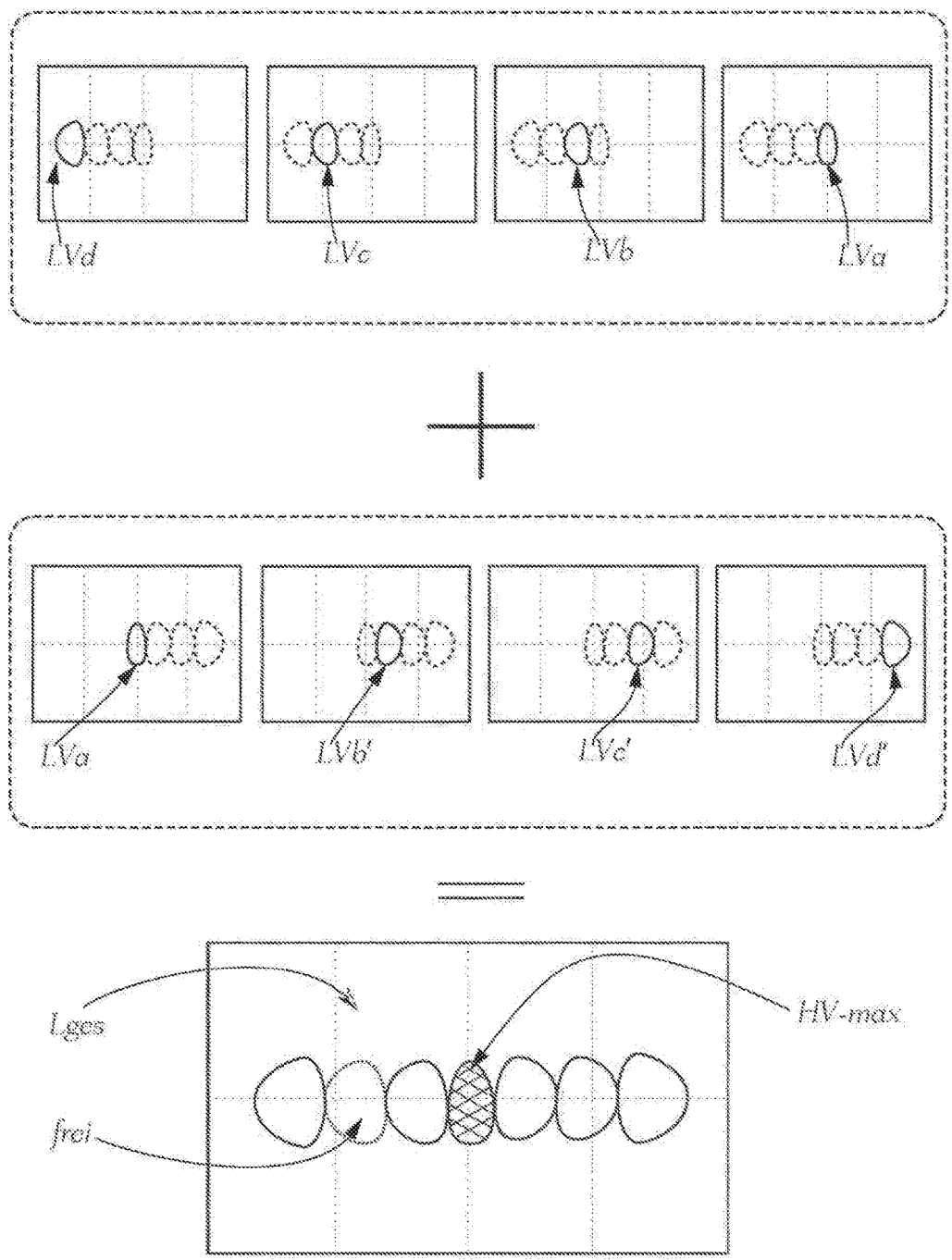
Figure 10A:
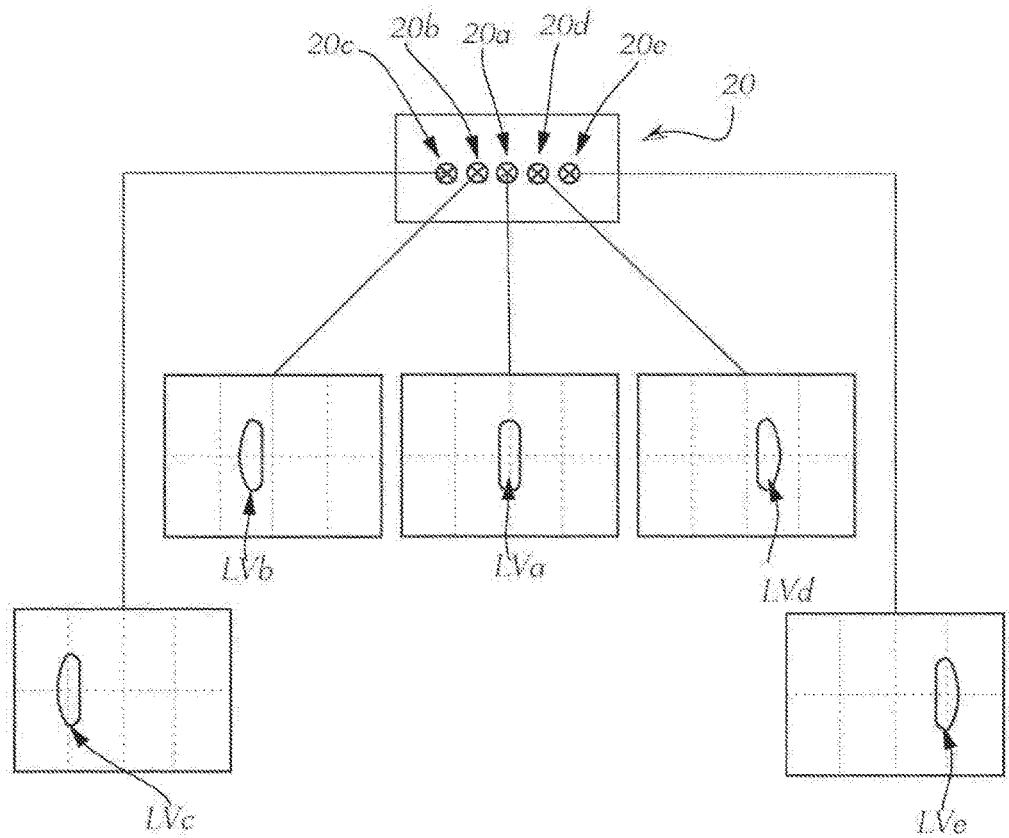
Figure 10B:
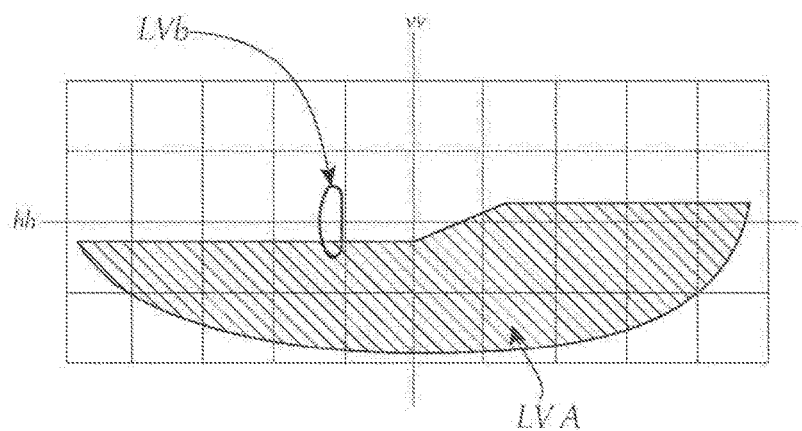

The invention is explained in greater detail hereinafter on the basis of the drawing, in which FIG. 1 shows a purely schematic illustration of a first illumination apparatus according to the invention, FIG. 2 shows a purely schematic illustration of a second illumination apparatus according to the invention, FIG. 3 shows a purely schematic illustration of a third illumination apparatus according to the invention, FIG. 4 shows a purely schematic illustration of a fourth illumination apparatus according to the invention, FIG. 5 schematically shows a displacement of a partial light distribution using an illumination apparatus according to the present invention, FIG. 6 shows a schematic structure of an AOM with schematically indicated flat sound wave, FIG. 7 shows a structure as in FIG. 6 with a flat sound wave, which has an angle of aperture, FIG. 8 shows a schematic structure of an arrangement according to the invention for vertical and horizontal deflection of a light distribution or partial light distribution, FIG. 9a shows a schematic arrangement for producing a left part of a light distribution, FIG. 9b shows a schematic arrangement for producing the right part of the light distribution, FIG. 9c shows the light distribution resulting from superimposition of the partial light distributions from FIGS. 9a and 9b, FIG. 10a shows an arrangement for selective illumination of areas in front of a motor vehicle, FIG. 10b shows a corresponding light distribution, and FIG. 11 shows a known arrangement according to the prior art.

FIG. 11 shows an illumination apparatus 100' for a motor vehicle according to the prior art. This illumination apparatus 100' comprises a laser light source 10' for producing excitation light (laser light), a wavelength conversion element 20', which is designed to receive excitation light from the laser light source 10' in the form of an excitation-light light bundle, and in the shown example three optical imaging elements 30a', 30b', 30c' in the form of reflectors, which are assigned to the conversion element 20'. The reflectors 30a'-30c' image light, which is emitted by the wavelength conversion element 20' in the visible wavelength range, in the form of a light distribution or a partial light distribution into an area in front of the illumination apparatus or a motor vehicle in which the illumination apparatus is installed.

As can be seen in FIG. 11, a deflection element 26 in the form of a deflection mirror is provided. Incident laser light is deflected by the mirror 26 into a region 20a' of the conversion element 20', which region 20a' emits light in the visible wavelength range, and is imaged by the reflector 30a' as described above as a light distribution.

The mirror 26 is adjustable in respect of its orientation by means of an actuator 27, for example the mirror 26 can be pivoted about an axis (not shown), which for example is normal to the plane of the drawing. The incident light beam can thus be deflected onto another region on the conversion element 20c', for example the region 20b' or 20c'. The visible light emitted from these regions is imaged, respectively, by the reflectors 30b' or 30c' as a light distribution, wherein these light distributions lie in the light pattern in front of the motor vehicle at positions different from that of the light distribution produced by the reflector 20a'.

A disadvantage of a known arrangement of this kind is that movable parts, such as a movable mirror, are necessary for the illumination of different regions on the conversion element 20'.

In accordance with an illumination apparatus 100 according to the invention, as shown in FIG. 1, the laser beam is deflected by an acousto-optic modulator (AOM) 40. Specifically, the schematic illustration from FIG. 1 shows an illumination apparatus 100 for a motor vehicle, which comprises a laser light source 10 for producing and emitting excitation light (laser light), the illumination apparatus 100 further comprising a wavelength conversion element 20, which is designed to receive excitation light in the form of an excitation-light light bundle from the laser light source 10, and in the shown example three optical imaging elements 30a, 30b, 30c in the form of reflectors, which are assigned to the conversion element 20, i.e. different regions 20a, 20b, 20c of the conversion element 20. The, or a, focal point of a reflector 30a, 30b, 30c preferably lies in the associated region 20a, 20b, 20c of the conversion element 20.

The reflectors 30a-30c image light, which is emitted by the wavelength conversion element 20 in the visible wavelength range in the regions 20a, 20b, 20c, in the form of a light distribution or a partial light distribution into an area in front of the illumination apparatus 100 or a motor vehicle in which the illumination apparatus 100 is installed.

In accordance with the invention an AOM 40 is provided between the laser light source 10 and the conversion element 20. Here, the AOM 40 comprises a solid medium 40a which is optically transparent at least for the excitation light of the laser light source 10. This solid medium 40a is for example arranged in a main body or forms a main body 40a of this kind.

An acoustic, in particular ultrasound-based actuator 42 is mounted to an edge of the main body 40a and can send an acoustic wave (sound wave) SW to an absorber 43 mounted on an opposite side of the main body 40a.

A control device 41 is provided, by means of which the AOM 40 can be controlled in accordance with specified or specifiable control parameters, with the control device 41 in particular controlling the actuator 42, such that sound waves with a frequency, in particular with a number of, in particular, different frequencies can be produced in the acousto-optic modulator 40. This means that the frequency of the sound waves produced in the AOM 40, i.e. in the optically transparent solid medium 40a of the AOM 40, is variable, in particular variable over time.

The acoustic wave SW produces different optical densities within the main body 40a, such that the AOM 40 is able to deflect the beam path of the incident laser beam, since the beam path can be diffracted by the resultant diffraction grating. By determining different frequencies of the acoustic wave SW it is possible to produce different angles of deflection or diffraction, so that the diffracted laser beam deflected by the AOM 40 contacts the conversion element 20 in different regions 20a, 20b, 20c depending on the applied frequency. Here, it is provided that the deflection angle θ can be determined by the control device 41, preferably on the basis of the above-mentioned parameters.

In the switched-on state, the laser light source 10 preferably continuously emits a laser beam which preferably can be controlled in respect of the desired intensity. However, it can also be provided that laser light is emitted in a pulsed manner. In this latter case, it is preferably provided that the control device 41 also ensures that a complete light pulse of the light source 10 is always deflected. Here, it can be provided that, during the time in which a sound wave of specific frequency is produced, exactly one laser light pulse is sent by the AOM, however it can also be provided that a plurality of laser light pulses are sent in this period of constant frequency by the AOM.

FIG. 1 shows three different angles of deflection for the diffracted laser beam, corresponding to three different frequencies for the sound waves in the AOM 40, wherein different regions 20a, 20b, 20c of the conversion element 40 are illuminated accordingly by the laser beam, from which regions mixed light, as described in the introduction, is then emitted and imaged by the particular associated reflector 30a, 30b, 30c.

FIG. 2 shows a structure comparable to FIG. 1, with the difference that the imaging means is provided here in the form of a single reflector 31. In this arrangement, the focal point of the reflector 31 lies for example in the region 20a of the conversion element 20, and light exiting from this region 20a is imaged by the reflector 31 in an accordingly focused manner. Light from the regions 20b, 20c not disposed in the focal point of the reflector 31 is imaged in a defocussed manner accordingly. A light or partial light distribution produced by the region 20a is imaged sharply accordingly, whereas a light or partial light distribution produced by the regions 20b, 20c is imaged in a blurred manner.

In an embodiment according to FIG. 1, the light or partial light distribution is imaged sharply from the three shown regions 20a-20c.

Depending on the desired effect, a choice can be made between the arrangements according to FIG. 1 (of course also with a different number of light spots and reflectors compared to those shown in FIG. 1, for example 2 reflectors or 4 or more reflectors) and FIG. 2, with mixed forms also being possible, in which one or more regions on the conversion element have their own reflectors, whereas other regions share a reflector.

FIG. 3 shows a modification of the illumination apparatus 100 from FIG. 2, wherein these modifications can be provided equally in an arrangement from FIG. 1 or mixed forms as described above. As a modification, it is provided that an optical deflecting device 50 is arranged between the conversion element 20 and the acousto-optic modulator 40, which deflecting device deflects excitation light, exiting from the at least one acousto-optic modulator 40, parallel to a basic diffraction direction or normal to an application plane of the conversion element (20) on which the excitation light is incident.

For example, the deflecting device 50 comprises an f-theta lens or an f-theta lens arrangement or a lens arrangement that comprises at least one f-theta lens or consists of at least one such lens.

An f-theta optics of this kind is shaped or can be shaped so that the laser beam, regardless of the extent of the deflection on the (or in the) planar conversion element, assumes an excitation face (volume) of equal size, regardless of the angle of deflection through the AOM. The final appearance (size, shape) of the produced (partial) light distribution thus remains substantially unchanged, even in the event of a displacement.

The conversion element 40 is usually formed, as shown, as a flat face or has a flat face (application plane), on which the laser light is incident. In such a case, a laser beam deflected in the basic diffraction direction (corresponding to the frequency $f_0$) is incident on the conversion element at an angle of 90°, for example. This case is provided by an alternative or additional optics—for example a telecentric objective—, which sets the conversion element in a telecentric beam path. By contrast, a beam deflected from the basic diffraction direction in accordance with the invention contacts the conversion element at another point at another angle, i.e. in this example at an angle unequal to 90°. Accordingly, not only the position of the light spot on the conversion element, but also the shape changes, which can be desirable in principle, but can also lead to an undesirable "blurry" light pattern.

FIG. 4 shows yet a further embodiment, in which a lens 32 is provided by way of example as optical imaging element and which preferably has a collecting effect. FIG. 4 also shows, in a preferred manner, an optical deflecting device 50 as described on the basis of FIG. 3, although this deflecting device 50 is optional.

The focal point of the lens 32 lies in one of the regions 20a-20c, for example in the region 20a. Alternatively, it can be provided that a separate, preferably light-collecting lens is provided for each region. Mixed forms as already described further above on the basis of reflectors are also possible in embodiments with lenses.

FIG. 5 shows purely schematically a horizontal displacement of a partial light distribution of a light pattern according to the invention. The conversion element 20 is irradiated with laser light in one of the regions 20a-20e depending on the applied frequency at an AOM (not illustrated), and light exiting from the particular region 20a-20e is imaged via an imaging element, as described above, into a region in front of the illumination apparatus. Here, the (partial) light distribution LVa-LVe thus produced lies in a different position in the light pattern depending on the region 20a-20e, wherein in the shown example the (partial) light distribution is displaced in the horizontal direction.

FIG. 6 shows an AOM 40 in an enlarged illustration. As described, a sound wave SW is produced in the AOM 40 by applying a frequency $f_0$, with the sound wave SW preferably being a flat wave SW with a direction of propagation R. A laser beam S1 contacts the AOM 40 at an angle $\theta_1$, wherein the angles are measured normal to the direction of propagation R of the sound wave SW.

Since the AOM 40 is made of an optically transparent medium 40a, without applied sound waves the laser beam would pass through the AOM in a straight line without deflection and would exit again from the AOM 40 as a laser beam S2.

By applying a frequency, there is now a deflection of the laser beam S1, and this exits again from the AOM 40 as laser beam S2'. The laser beam S2' is deflected here by an angle $\theta_2$.

As already described further above, it is advantageous if the AOM 40 operates in the Bragg regime, so that $\theta 1=\theta 2=\theta$, wherein $\theta$ is what is known as the Bragg angle, which must satisfy the $\sin(\theta)$ condition already explained in detail further above.

So that the Bragg condition is met, the AOM 40 is operated at what is known as a "basic frequency" $f_0$, at which the angle of incidence=angle of deflection=$\theta$.

The following relationships occur in the above example:

$$n\theta = \frac{\lambda}{2n}\frac{f0}{Vs},$$

with n=index of diffraction (in this example n=2.26), Vs=sound speed (4200 m/s) along a certain crystal orientation, $\lambda_0$=vacuum wavelength of the laser (450 nm), $f_0$=excitation frequency [Hz] and $\theta$=Bragg angle [°]. With a Bragg angle of 1.0°, a frequency of f=736 MHz is thus necessary under the above-described material conditions if the AOM operates in the Bragg regime.

For deflection of the excitation-light light bundle from a basic position on the conversion element, the basic frequency $f_0$ corresponding to this basic position is varied by a value of $+\Delta f$.

The excitation frequency of the sound waves is increased from $f_0$, at which the incident laser S1 beam is deflected in the basic diffraction direction $\theta$ (S2'), to $f_0+\Delta f$, whereby a greater angle of diffraction $\theta+\Delta\theta$ is given for the deflected laser beam S2".

The angle $\theta$ is here the angle between the incident/emergent laser beam and the normal direction to the direction of propagation of the sound wave.

The frequency change can occur continuously or in discrete steps.

The maximum possible angular range through which the diffracted light beam S2' can be deflected in a direction is given from $\Delta\theta=(\lambda/Vs)*B$. For laser light with a vacuum wavelength of $\lambda_0$=450 nm, this thus gives $\Delta\theta=(450\,nm/(n\,Vs))*B$, wherein n is the index of diffraction of the transparent medium of the AOM for a wavelength of 450 nm.

The maximum deflection range is thus from $\theta$ to $\theta+\Delta\theta$ for frequencies of $f_0+B$.

The bandwidth $B=\Delta f_{max}$ thus lies preferably at, at most, $f_0/2$.

As FIG. 7 shows, it can be advantageous if the sound wave, in particular the flat sound wave SW, has an angle of aperture $\delta\theta_S$, i.e. the sound wave diverges in the direction of propagation ("angular divergence"). Preferably, $\delta\theta_S \geq \Delta\theta$.

Generally, it can be advantageous if—both for flat sound waves with and without angle of aperture—the direction of propagation of the sound wave, in particular of the flat sound wave, can be changed. In particular, it is advantageous if the direction of propagation can be changed according to the frequency of the sound waves or the change in frequency of the sound waves. Here, the direction of propagation is changed in such a way that the angle between the incident laser beam and the direction of propagation of the sound wave changes. It can thus be ensured that, even with a change of the frequency of the sound waves, the AOM still operates in the Bragg regime.

The change in direction of the sound wave can be provided for example by the use of two or more sound generators, which for example are operated with different phase position.

The change in direction of the sound wave can alternatively or additionally be provided for example in that the AOM, i.e. in particular the optical transparent material, and the at least one sound generator are arranged rotatably.

FIG. 8 shows an illumination apparatus with two AOMs 40, wherein the first AOM as considered in the direction of light propagation brings about a horizontal deflection of the laser beam S1 and the second AOM 40 brings about a vertical deflection of the laser beam passing through the first AOM 40. Thus, both a horizontal deflection of the produced (partial) light distribution, for example for a cornering light, and a vertical deflection of the produced (partial) light distribution for adjusting the height of the light distribution, for example in order to adjust the distance range and/or to avoid glare, can be produced using the illumination apparatus shown here.

If both AOMs are operated with their respective basic frequencies, the illuminated spot on the conversion element 20 lies for example in the region B00, and if the frequency of the first AOM changes, the illuminated region B00 shifts horizontally to B10 (cornering light), and if the frequency of the second AOM changes, the illuminated region B00 shifts vertically to B01 (height adjustment), and if both frequencies change, this results both in a horizontal and vertical displacement to B11. Accordingly, the produced light distribution LV00 (corresponding to B00) shifts to LV10 (B10), LV01 (B01) and LV11 (B11) accordingly.

FIGS. 9a-9c show an arrangement in which a matrix light distribution is provided. The image refresh rates in this application preferably lie in the kilohertz range.

FIG. 9a symbolises a left headlamp, and FIG. 9b symbolises a right headlamp. A first conversion element 201, installed in the vehicle in a left headlamp, is illuminated by a first laser light source via an AOM in accordance with the present invention (FIG. 9a). With this arrangement a left region in the light pattern is produced. FIG. 9b shows a second illumination apparatus, in which a second conversion element 202—right headlamp, can be irradiated with laser light in accordance with the invention. By way of example, the four regions 20a'-20d' are shown. A right region in the light pattern is illuminated with this second illumination apparatus.

It is noted at this juncture that in this example, as in all previous examples, discrete, delimited regions have always been presented, which are irradiated on a conversion element by laser light. This can correspond to the actual conditions, i.e. it can be provided that actually only discrete regions of the conversion element are illuminated (the transition is then either so quick that intermediate positions in the light pattern cannot be perceived or are hardly perceived, or the laser light source is switched off as the illuminated region is changed), however a "spatially continuous" illumination can also be provided, in which case the transition between adjacent illuminated regions is continuous.

In accordance with the invention, different regions 20a-20d of the first conversion element 201 can be illuminated in sequence with a certain image refresh rate, and depending on the illuminated region 20a-20d a partial light distribution LVa-LVd is produced in the light pattern in the left region of the light image. Different regions 20a-20d of the first conversion element 201 can also be illuminated in sequence with the image refresh rate, and depending on the illuminated region 20a-20d a partial light distribution LVa-LVd is produced in the left region of the light pattern.

FIG. 9c shows a total light distribution Lges produced with the two illumination apparatuses, as this appears to a viewer as a continuously illuminated area on account of the image refresh rate. Since the individual partial light patterns are activated sufficiently quickly in sequence in the short term, an entire light pattern (total light distribution) appears.

The region HV-max symbolises a main beam maximum, since partial light distributions of the right and left illumination apparatus superimpose one another in this region. The dashed region additionally represents a masked scenario, in which the corresponding region in the light pattern is not illuminated, for example on account of oncoming traffic, in that the laser light beam is not directed onto the corresponding region on the conversion element for the period of time during which this region should not be illuminated.

FIG. 10a shows an arrangement in analogy to FIG. 5. Similarly to that illustrated and described in FIG. 5, different partial light distributions LVa-LVe can be produced by illumination of different regions 20a-20e on a conversion element 20 and are disposed in different positions in the horizontal direction in accordance with the invention.

FIG. 10b shows a dipped beam light distribution LVA, which for example is produced using a separate illumination unit. By switching on the laser light source, this dipped beam light distribution can be superimposed by a partial light distribution, for example the partial light distribution LVb as illustrated by illumination of the region LVb on the conversion element 20, so that an object or subject in this region can be selectively illuminated.

As described above, an illumination apparatus according to the invention is preferably installed in a motor vehicle. Here, the illumination apparatus is part of a vehicle headlamp, or the illumination apparatus forms a vehicle headlamp.

As described above, a control device 41 is provided, by means of which the AOM or the optionally two or more AOMs is/are controlled. If necessary for the specific application, the control device can additionally also control the light source.

The control device 41 can be part of the illumination apparatus, but can also be part of the vehicle headlamp or of the motor vehicle.

The control device preferably controls the one or more AOMs on the basis of control parameters, which give the desired angle of deflection of the light distribution or a partial light distribution in the light pattern or in a total light distribution.

These control parameters at a defined moment in time or in a defined period of time are dependent on the state of the motor vehicle, preferably on the state at this defined moment in time/in this defined period of time or on a state of the motor vehicle in a period of time around this defined moment in time.

The state of the motor vehicle can be described for example or is given for example from the following vehicle "properties":

for example steering angle of the vehicle;
speed of the vehicle;
acceleration of the vehicle;
position of the vehicle, wherein the position data are provided for example from a navigation unit of the vehicle;
camera data of the vehicle surroundings (for example type and location of other road users and/or objects);
road state;
road course (bends, ascents, descents).

This list is merely exemplary, and the control parameters can be constituted by any combinations of the vehicle and/or ambient properties, etc. mentioned above and further above (referred to as vehicle "properties"), wherein the state at different moments in time or in different periods of time can also be provided from different vehicle "properties".

The invention claimed is:

1. An illumination apparatus (100) for a motor vehicle, comprising:
at least one laser light source (10) configured to produce excitation light;
at least one wavelength conversion element (20), which is designed to receive the excitation light from the at least one laser light source (10) in the form of an excitation-light light bundle;
at least one optical imaging element (30a, 30b, 30c; 31; 32), which is configured to image light, which is emitted in the visible wavelength range by the at least one wavelength conversion element (20), in the form of at least one light distribution or one partial light distribution (LVa, LVb, LVc, LVd, LVe); and at least one beam-deflecting device in the beam path between the at least one laser light source (10) and the at least one wavelength conversion element (20), wherein the at least one beam-deflecting device is designed as an acousto-optic modulator (40), which comprises a solid medium (40a), which is optically transparent at least to the excitation light of the at least one laser light source (10) and through which the excitation-light light bundle is configured to be passed, wherein sound waves having a frequency, or a plurality of different frequencies, are configured to be produced in the solid medium (40a) of the acousto-optic modulator (40) such that the excitation-light light bundle is deflected to different regions (20a, 20b, 20c; 20a, 20b, 20c, 20d, 20e) of a conversion element (20) and/or to different conversion elements in accordance with the frequency of the applied sound waves, and wherein an optical deflecting device (50) is arranged between the at least one conversion element (20) and the at least one acousto-optic modulator (40), which deflecting device is configured to deflect the excitation light, exiting from the at least one acousto-optic modulator (40) or the acousto-optic modulator arranged closest to the conversion element (20), parallel to a basic diffraction direction or normal to an application plane of the conversion element (20) on which the excitation light is incident.

2. The illumination apparatus according to claim 1, wherein a second acousto-optic modulator is arranged between a first acousto-optic modulator and the at least one wavelength conversion element, the solid medium of said second acousto-optic modulator being configured to be passed through by the excitation light exiting from the first acousto-optic modulator, and wherein the second and the first acousto-optic modulator are arranged relative to one another in such a way that the direction of propagation of the sound waves in the two acousto-optic modulators are orthogonal to one another.

3. The illumination apparatus according to claim 1, wherein the frequency of the sound waves applied to the at least one acousto-optic modulator (40) is varied over time by a control device (41) that is designed to vary the frequency of the sound waves over time.

4. The illumination apparatus according to claim 1, wherein the produced sound waves are flat waves (SW).

5. The illumination apparatus according to claim 1, wherein the at least one acousto-optic modulator (40) is configured to be operated in the Bragg regime.

6. The illumination apparatus according to claim 5, wherein for deflection of the excitation-light light bundle from a basic position on the conversion element, the basic frequency $f_0$ corresponding to this basic position is varied by a value of $+\Delta f$.

7. The illumination apparatus according to claim 6, wherein the frequency change occurs continuously or in steps.

8. The illumination apparatus according to claim 1, wherein the frequencies of the sound waves lie in a range of from 80 to 2500 MHz.

9. The illumination apparatus according to claim 1, wherein exactly one optical imaging element (31, 32) is provided or exactly one optical imaging element (31, 32) for each conversion element (20) is provided.

10. The illumination apparatus according to claim 1, wherein exactly one optical imaging element (30a, 30b, 30c) is provided for each region (20a, 20b, 20c) of a conversion element (20) in which excitation light can be deflected.

11. The illumination apparatus according to claim 1, wherein one or more optical imaging elements (30a, 30b, 30c; 31) is/are designed as a reflector or reflectors.

12. The illumination apparatus according to claim 1, wherein one or more optical imaging elements (32) is/are formed as a lens or from lenses.

13. The illumination apparatus according to claim 1, wherein the deflecting device (50) comprises or consists of a lens arrangement for a telecentric objective.

14. The illumination apparatus according to claim 1, wherein the illumination apparatus is installed in a motor vehicle, and the control parameters at a defined moment in time are dependent on a state of the motor vehicle at this defined moment in time or are dependent on a state of the motor vehicle within a time period around this defined moment in time.

15. The illumination apparatus according to claim 1, wherein the produced light distribution or partial light distribution can be displaced in the horizontal and/or vertical direction.

16. The illumination apparatus according to claim 1, wherein the produced partial light distribution forms part of a main beam distribution.

17. The illumination apparatus of claim 16, wherein the produced partial light distribution forms part of a central, maximum spot of the main beam distribution.

18. The illumination apparatus according to claim 1, wherein the sound waves have an angle of aperture $\delta\theta_S$ in the solid medium (40a), wherein $\delta\theta_S \geq \Delta\theta$, and wherein $\Delta\theta$ is the maximum angle of deflection of the laser beam from a basic diffraction direction.

19. The illumination apparatus according to claim 18, wherein the sound waves are flat sound waves.

20. The illumination apparatus according to claim 1, wherein the direction of propagation of the sound waves, in particular of flat sound waves, can be changed, wherein the direction of propagation can be changed according to the frequency of the sound waves or the change in frequency of the sound waves.

21. An illumination system comprising two or more illumination apparatuses according to claim 1, wherein each of the illumination apparatuses is configured to form a partial light distribution, which partial light distributions are arranged side by side and/or one above the other, with neighbouring and/or adjacent partial light distributions overlapping one another in part.

22. A motor vehicle headlamp having one or more illumination apparatuses according to claim 1.

23. The illumination apparatus of claim 1, wherein the sound waves having a frequency, or a plurality of different frequencies, are configured to be produced in the solid medium (40a) of the acousto-optic modulator (40) by means of a control device (41), which controls the at least one acousto-optic modulator (40) in accordance with specified or specifiable control parameters.

24. The illumination apparatus according to claim 1, An illumination apparatus (100) for a motor vehicle, comprising:
    at least one laser light source (10) configured to produce excitation light;
    at least one wavelength conversion element (20), which is designed to receive the excitation light from the at least one laser light source (10) in the form of an excitation-light light bundle;
    at least one optical imaging element (30a, 30b, 30c; 31; 32), which is configured to image light, which is emitted in the visible wavelength range by the at least one wavelength conversion element (20), in the form of at least one light distribution or one partial light distribution (LVa, LVb, LVc, LVd, LVe); and at least one beam-deflecting device in the beam path between the at least one laser light source (10) and the at least one wavelength conversion element (20), wherein the at least one beam-deflecting device is designed as an acousto-optic modulator (40), which comprises a solid medium (40*a*), which is optically transparent at least to the excitation light of the at least one laser light source (10) and through which the excitation-light light bundle is configured to be passed, wherein sound waves having a frequency, or a plurality of different frequencies, are configured to be produced in the solid medium (40*a*) of the acousto-optic modulator (40) such that the excitation-light light bundle is deflected to different regions (20*a*, 20*b*, 20*c*, 20*a*, 20*b*, 20*c*, 20*d*, 20*e*) of a conversion element (20) and/or to different conversion elements in accordance with the frequency of the applied sound waves, and wherein an optical deflecting device (50) is arranged between the at least one conversion element (20) and the at least one acousto-optic modulator (40), which deflecting device is configured to deflect the excitation light, exiting from the at least one acousto-optic modulator (40) or the acousto-optic modulator arranged closest to the conversion element (20), in such a way that laser light spots of equal size are produced on a planar conversion element regardless of the angle of deflection.

25. The illumination apparatus according to claim 24, wherein the deflecting device (50) comprises an f-theta lens or an f-theta lens arrangement or a lens arrangement that comprises or consists of at least one f-theta lens.

\* \* \* \* \*